Sept. 25, 1962  H. D. MacDONALD, JR., ET AL  3,055,619
EXTENSIBLE ROCKET CATAPULT
Filed April 10, 1958
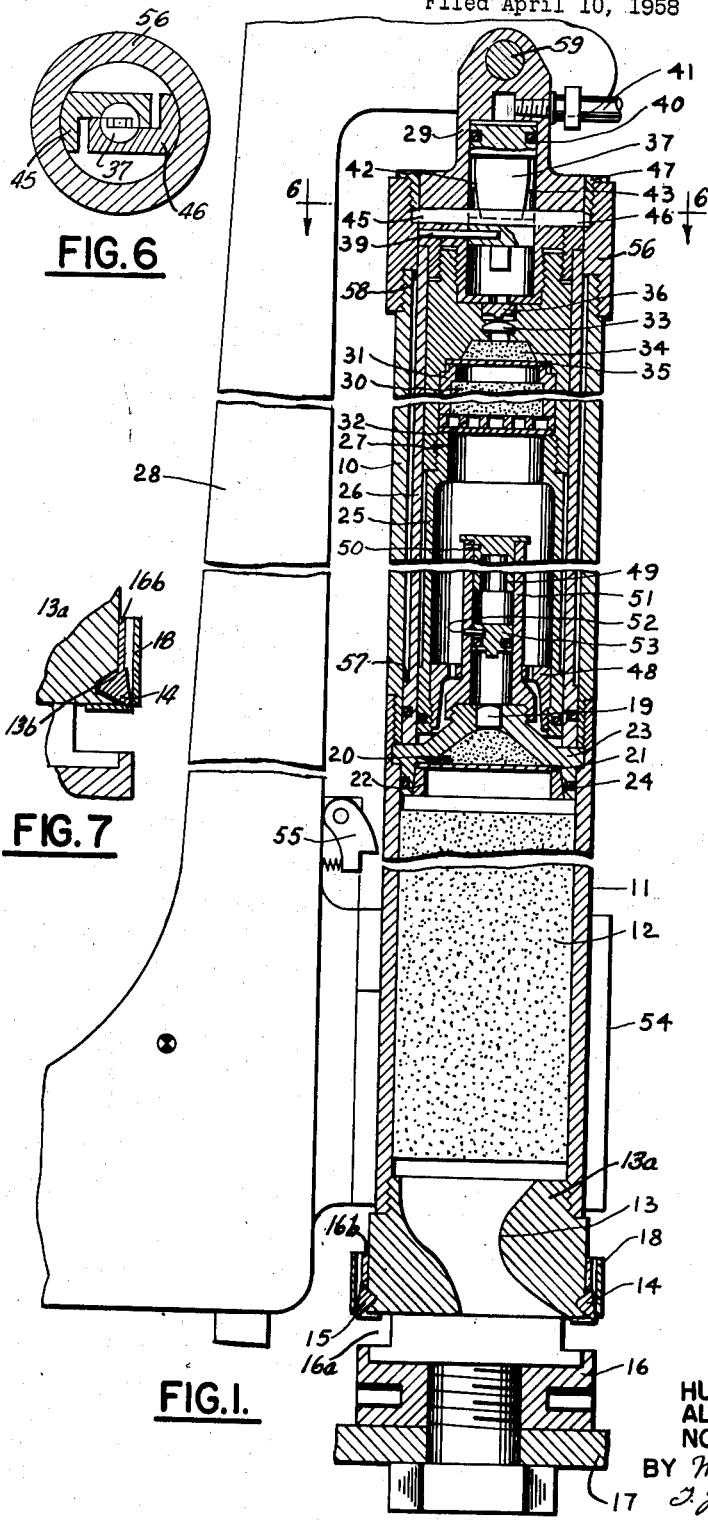
FIG. 6.
FIG. 7.
FIG. 1.
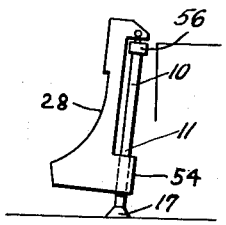
FIG. 2.
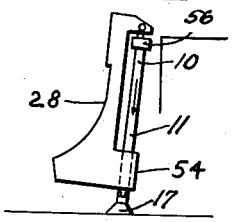
FIG. 3.
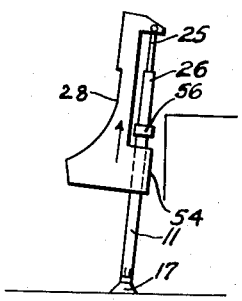
FIG. 4.
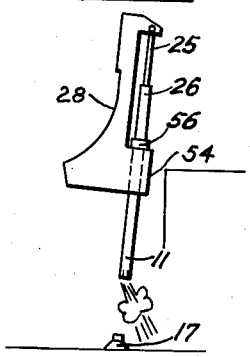
FIG. 5.
INVENTORS
HUGH D. MAC DONALD, JR.
ALBERT M. STOTT
NORMAN J. WAECKER
BY W. E. Thibodeau
J. J. Lynch + H. R. Johns United States Patent Office  3,055,619
Patented Sept. 25, 1962

3,055,619
EXTENSIBLE ROCKET CATAPULT
Hugh D. MacDonald, Jr., Philadelphia, and Albert M. Stott, Aldan-Clifton Heights, Pa., and Norman J. Waecker, Masonville, N.J., assignors to the United States of America as represented by the Secretary of the Army
Filed Apr. 10, 1958, Ser. No. 727,750
6 Claims. (Cl. 244—122)
(Granted under Title 35, U.S. Code (1952), sec. 266)

The invention described herein may be manufactured and used by or for the Government for governmental purposes without the payment of any royalty thereon.

This invention relates to means for removing a mass from a moving vehicle, and more especially to an improved apparatus and method of operation whereby a man-seat mass may be removed from an aircraft with a higher degree of safety than that heretofore attained.

The means heretofore provided for removing personnel from moving aircraft has not always operated without injury to the personnel. This is especially true where the aircraft is moving at very high speeds, where the removal is effected at relatively low altitudes, or in the case of an aircraft having high tail empennage. It is, therefore, desirable that the ejected mass have a higher trajectory, be subjected to a lesser negative deceleration in the original direction of its movement, and have its position more completely stabilized immediately following its separation from the aircraft. The present invention achieves these results by applying to the ejected mass a force which continues to act on it for some time after its separation from the aircraft. In the illustrated form of the invention, the means utilized for this purpose include a rocket which remains fixed to the mass after its separation from the aircraft and has its nozzle so directed as to apply a force directed through the gravitational center of the mass of the occupant, seat, and catapult after leaving the aircraft. An additional advantage of the catapult herein disclosed is that hot gases are discharged from it only beneath the seat and in a direction from which the seat is moving, thus reducing the possibility of injury from contact with the hot gas.

The invention will be better understood from the following description when considered in connection with the accompanying drawings and its scope is indicated by the appended claims.

Referring to the drawings:

FIG. 1 is a sectional view illustrating the various details of a catapult constructed in accordance with the invention, FIGS. 2 to 5 illustrate successive positions of the seat in the course of its departure from the aircraft, and FIG. 6 is a sectional top plan view on the line 6—6 of FIG. 1 of the locking members 45 and 46, FIG. 7 is a slightly larger scale sectional detail of a locking key 14.

The catapult of FIG. 1 includes an outer casing consisting of two parts, 10 and 11, which are threaded together at their adjacent ends.

The part 11 of the outer casing encloses a rocket propellant 12 which is associated with a nozzle 13, this nozzle being attached through locking keys 14—15 and a retaining ring 18 to a base 16 which base 16 and retaining ring 18, are fixed to the aircraft structure 17. Also associated with the propellant 12 are a percussion primer 19, a black powder ignition charge 20, a powder retaining disk 21, a disk retainer 22 and a separator 23 surrounded by a sealing ring 24. As hereinafter explained, the purpose of the charge 20 is to ignite the rocket propellant 12. The purpose of keys 14 and 15 is to prevent any thrust on the seat and catapult incident to flying from moving them away from base 16 before firing the catapult. With these keys 14 and 15 in position in FIG. 7 the rocket base 13a is provided with a peripheral groove 13b in which the keys 14 and 15 are held by retaining ring 18. A portion 16b of base 16 extends over these keys to limit any upward movement. When rocket has been moved down to contact base 16 the retaining ring 18 is above the top of the keys; these keys then fall out of the groove 13b and the base 13a of the rocket is then able to contact base 16 as an abutment during upward movement of the catapult.

Located in the part 10 of the outer casing are an outer tube 26 and an inner tube 25 of a catapult which is threaded to the casing of a cartridge 27 which cartridge casing is mechanically coupled through a link 29 to an aircraft seat 28 with the aid of a bolt 59.

The cartridge 27 includes a propellant 30, for a catapult or thruster, a liner 31, a propellant trap 32, a primer 33, a black powder charge 34 for igniting the propellant 30, a powder retaining disk 35, and a firing plug 36.

A firing pin 37, movable within the lower part of the link 29 and fixed in position by a shear pin 39, is surrounded by a sealing ring 40 and is adapted to be activated in response to the pressure of a gas applied through a tube 41. This firing pin 37 has cam-shaped surfaces 42 and 43 which cooperate in a well-known manner with a pair of U-shaped latches 45 and 46 to unlock the inner and outer tubes 25 and 26 from the outer casing parts 10 and 11. These U-shaped latches have their open sides facing one another with the inner leg of each extending into the open part of the other. In the locked position as indicated by FIG. 6 these inner legs are relatively close together and the outer legs are in engagement with a stop ring 47. When sufficient pressure is applied to the firing pin 37, the pin 39 is sheared, the inner legs are forced apart by the surfaces 42—43 to withdraw the members 45 and 46 inwardly from the bottom shoulder of ring 47 and the cartridge 27 is fired.

Firing of the cartridge 27 produces two effects. It produces a reaction force whereby the outer casing 10—11 is unlocked from its support 16, and it generates a gas which functions to initiate extension of the tubes 25 and 26 thereby starting the seat-man mass on its way out of the aircraft. More specifically gas pressure from the cartridge 27 acts both upwardly and downwardly. The upward pressure raises inner tube 25 and the tube 26 with the link 29 and seat 28 until the tube 26 is stopped and the inner tube 25 continues outward. As shoulder 57 on the lower outer portion of tube 26 engages a corresponding shoulder 58 on the stop 56 to limit outward movement of tube 26 allowing the inner tube 25 to continue its upward travel until the stop 56 on the outer casing engages the bushing 54 and limits downward movement of the casing 10—11, and the link 29 and seat limit upward travel of the inner tube 25. Gas pressure from propellant 30 passes through the perforations illustrated to the lower side of the spider 48 and acts upon the separator 23 causing the outer casing parts 10—11 to be moved downward as mentioned above.

Unlocking of the outer casing 10—11 from the base 16 is accomplished by means of a mechanism which normally holds the seat securely, using the rocket-catapult as a link against a stop. The reaction force produced by firing of the cartridge 27 produces an axial motion of the casing parts 10—11 with respect to the retaining ring 18 fixed to the base 16 and aircraft structure. This frees the keys 14 and 15 which release the casing 10—11 from the base 16 and aircraft. No claim is made to this specific type connection and any other prior connection responsive to longitudinal movement of one part should be suitable for release. The positions of the seat before and after this unlocking operation are indicated in FIGS.

2 and 3, FIG. 2 showing the installed position of the rocket-catapult and FIG. 3 showing that the seat has not moved but the catapult casing 10—11 has moved approximately one-half inch downwardly, unlocking the seat 28 from the base 16 as previously indicated.

The gas pressure generated by burning of the propellant 30 acts upon the effective piston area i.e. within the circumferences of tubes 25 and 26 which are closed at their upper end portions producing a force by which the tubes 25 and 26 are extended. At a predetermined point in the travel of the inner tube 25, a spider 48 fixed to the inner tube 25 engages the head of a plunger 49 shown in FIG. 1 extending radially outward into the path of spider 48 as it is raised with the inner tube shearing a pin 50 and withdrawing the plunger from an ignition tube 51. Thereupon the pressure of the gas in the tube 51 shears a pin 52 and drives a firing pin 53 against the primer 19 by which the rocket is fired.

The outer casing 10 and 11 is guided by a bushing 54 on the back of the seat 28 as indicated by FIG. 4 and is locked by a latch 55, which engages the top edge of a stop 56 with the seat in a position such that the thrust of the rocket, as directed by its nozzle 13 passes through the man-seat mass center of gravity. This downward extension of the tube 10—11 is advantageous in that the thrust of the rocket is directed in a more nearly vertical direction so that the man-seat mass is ejected to a greater height than would be possible if the rocket nozzle was not moved with respect to the seat. The locked position of the seat is indicated by FIG. 5.

When the rocket-catapult reaches its fully extended length, the inertia of the ejected mass and linkage, together with the thrust of the rocket, causes the complete separation of the man-seat mass which continues in flight away from the aircraft under the assistance of the rocket thrust. The angle of cant of the nozzle 13 can be fixed or movable and acts to produce a force which decreases deceleration and is so directed that tumbling is avoided. Therefore, a fin stabilized seat provided with a rocket-catapult can be made very stable, a consummation very desirable from the physiological standpoint.

As shown by FIG. 5, this rocket-produced force is applied from a point considerably below the seat 28 and has a predominant vertical component by which the man-seat mass is given an usually high trajectory.

From the foregoing description, it will be apparent to those familiar with ejection catapults for aircraft that pressure through the tube 41 moves the tapered firing pin 37 downward unlocking the latches 45 and 46, by radial inward movements as described in Patent 2,780,961 to Musser et al. dated Feb. 12, 1957 (FIGS. 4 and 6), shearing pin 39 actuating firing plug 36, igniting primer 33 and powder charge 34 which in turn ignites the propellant 30 for the catapult. Pressure in the space above separator 23 acts in both directions, but due to the load on the upper end from the weight of the seat 28 and occupant being heavier than the lower end, the outer casing 10—11 is moved downward far enough for the lower face of the nozzle 13 to engage the base 16 as a foundation to withstand the thrust necessary to raise the seat and occupant. On moving the outer casing 10—11 into contact with base 16, the locking keys are moved below the lower edge of the retaining ring 18, wedge shaped keys 14 and 15 fall outward and downward so that upward movement of the catapult is unimpeded. After engaging base 16 pressured due to propellant 30 moves tubes 25 and 26 upward raising the seat through link 29. Both tubes 25 and 26 move together until shoulder ledge 57 on the lower outside of the tube 26 abuts the shoulder ledge 58 shown on the stop 56. Stoppage of tube 26 does not prevent pressure continuing upward movement of the inner tube 25 and link 29 with seat 28 and its occupant. With the upward movement of the two tubes 25 and 26 the cap or plunger 49 is removed after shearing pin 50, opening the ignition tube 51 to pressure from propellant 30, shearing another pin 52 actuating the percussion primer 19 by firing pin 53 and igniting the rocket propellant 12. Those familiar with the catapult and rocket ignition arts know that the rupture of successive shear pins and time for successive ignitions are not instantaneous and this is especially true for obtaining ignition of the usual rocket propellant 12, which is usually slower burning than the propellant 30. Thus the position of parts shown in FIG. 4 of the drawing is reached after the ignition of propellant 12 has started but before its intensity has been sufficient to lift the seat due to the rocket action. The lifting action for the seat is due principally to the propellant 30 up to the position of the parts shown by FIG. 4. The initial ejection of seats from aircraft by a catapult usually occurs along a track or guideway. Since the base 16 and aircraft structure are considered as being fixed, at least as far as the catapult action is concerned the extension of the catapult must lift the seat away from the base 16. From FIG. 4 it will be apparent the rocket lift comes into action soon after the position of parts shown by FIG. 4 and before the stop 56 reaches the bushing 54 as shown by FIG. 5. Latch 55 under influence of its spring illustrated in FIG. 1, engages the top surface of stop 56 and holds casing 10—11 in its FIG. 5 position during the lifting exerted by the rocket.

Among the advantages of this invention may be mentioned the attainment of high elevations without the attainment of dangerously rapid accelerations since the rocket propellant is ignited after a predetermined and definite lifting travel of the catapult alone. Another advantage is the necessity for a smaller lateral component of rocket thrust by moving the rocket nozzle 13 in the lower end of the casing portion 11 more nearly directly under seat 28 so that it may have almost a direct upward thrust in FIG. 5.

We claim:

1. The combination with an ejection seat for personnel from an aircraft, of a combined rocket and catapult for removal of said seat from an aircraft, said combined rocket and catapult including an outer casing having upper and lower portions, said catapult being in an upper portion of said casing and including telescopic tubes, a propellant for said catapult and located in an inner one of said telescopic tubes, means for firing said propellant, means for locking said firing means and catapult against being prematurely fired, means for unlocking said locking means in response to gas pressure from outside said outer casing, a rocket nozzle secured below a lower portion of the outer casing, a rocket propellant in said lower portion of said outer casing, means for firing said rocket propellant in response to and after firing said catapult propellant, said rocket firing means including time delay means for firing said rocket propellant and including a frangible pin engaged by and ruptured during upward movement of said telescopic tubes within said outer casing, an abutment support fixed to an aircraft and against which said outer casing presses as said catapult raises said seat, said seat being raised by said telescopic tubes moving outwardly and upwardly with respect to said outer casing, means locking said rocket nozzle to said abutment support, and means responsive to downward movement by said outer casing for unlocking said rocket nozzle on firing said catapult propellant, whereby said seat is raised first by said catapult and subsequently by said rocket nozzle.

2. The combination with a seat for ejection for an occupant from an aircraft of a combination catapult and rocket propulsion device carried by said seat, said device including an upstanding casing, a catapult propellant in an upper portion of said casing, a rocket propellant in a lower portion of said casing but separated from said catapult propellant, telescopic tubes at least one of which is secured to said seat for movement out of said casing in response to firing said catapult propellant, a rocket nozzle attached to a lower end of said casing and communicating with the interior thereof through which products of combustion from said rocket propellant are discharged after first firing said catapult propellant, and means whereby said rocket nozzle is moved into alinement with a center of gravity of said seat and its occupant during elevation of said seat by said catapult propellant.

3. The combination with a seat for ejection of personnel from an aircraft of a combined rocket and catapult for removal of said seat from an aircraft, said catapult being disposed above said rocket and between said seat and said rocket, a casing, a catapult including a catapult propellant within an upper portion of said casing and a member articulating with said seat, said member being extensible from said casing upon the firing of said catapult propellant, a first lock between said member and said casing, a rocket propellant having its upper end adjacent a lower end of said member, a rocket nozzle attached to a lower end of said casing and communicating with the interior thereof, a firing pin for firing said catapult propellant, said firing pin engaging said first lock whereby on movement of said firing pin said first lock is released, a fixed support against which said rocket nozzle may be pressed, a second lock adjacent the lower end of said casing and between said rocket nozzle and said support, and mechanism operable by the firing of said catapult propellant to release said rocket nozzle from said support, catapult propellant generated pressure responsive means operated by extension of said member to fire said rocket propellant, a shoulder element screw-threaded around the uppermost portion of said casing, a connecting latch spring-mounted to said seat at a point below said shoulder element for engaging said shoulder element to hold the moving seat in a locked position.

4. The device of claim 3 further characterized by a first pressure responsive means for operating said first lock to release said member and for firing said catapult propellant, and a second catapult propellant pressure responsive means operated by extension of said member for firing of said rocket propellant.

5. The device of claim 4 wherein said second catapult propellant pressure responsive means includes an ignition rocket propellant adjacent an uppermost portion of said rocket propellant, an ignition tube associated with and disposed above said ignition rocket propellant a second firing pin, said second firing pin being disposed within said ignition tube and a cap at the uppermost portion of said ignition tube whereby said cap is opened at a predetermined point in the travel of said member to admit pressurized fluid to said second firing pin.

6. The combination with a seat for ejection of personnel from an aircraft of a combined rocket and catapult for removal of said seat from an aircraft, said catapult being disposed above said rocket and between said seat and said rocket, a casing, a catapult including a catapult propellant within an upper portion of said casing, telescoping extensible tubes within an upper portion of said casing between the casing and catapult propellant, said telescoping tubes comprising an inner tube and an outer tube, said inner tube articulating with said seat to be moved, said inner tube being extensible from said casing upon the firing of said catapult propellant, a first lock between said inner tube and said casing, a rocket propellant having its upper end adjacent a lower end of said inner tube, a rocket nozzle attached to a lower end of said casing and communicating with the interior thereof, a firing pin for firing said catapult propellant, said firing pin engaging said first lock whereby on movement of said firing pin said first lock is released, a fixed support against which said rocket nozzle may be pressed, a second lock adjacent the lower end of said casing and between said rocket nozzle and said support, and mechanism operable by the firing of said catapult propellant to release said rocket nozzle from said support, catapult propellant generated pressure responsive means operated by extension of said inner tube to fire said rocket propellant, said last mentioned means including an ignition tube within said casing between said rocket propellant and catapult propellant, a cap closing an upper end portion of said ignition tube, a spider fixed to said inner tube and movable along the outer periphery of said ignition tube during outward movement of said telescoping extensible tubes for removal of said cap from said ignition tube when said spider reaches said cap.

References Cited in the file of this patent

UNITED STATES PATENTS

| 2,516,902 | Musser | Aug. 1, 1950 |
| 2,552,181 | Kleinhans | May 8, 1951 |
| 2,900,150 | Hirt et al. | Aug. 18, 1959 |

FOREIGN PATENTS

| 1,161,505 | France | Mar. 24, 1958 |

OTHER REFERENCES

Aviation Week, November 12, 1956 (pages 71, 72, 74, and 77 relied on).